(12) United States Patent
Zhuang et al.

(10) Patent No.: US 11,897,454 B2
(45) Date of Patent: Feb. 13, 2024

(54) METHOD AND APPARATUS FOR DETERMINING AUTOMATIC PARKING STRATEGY

(71) Applicant: HUAWEI TECHNOLOGIES CO., LTD., Guangdong (CN)

(72) Inventors: Yuzheng Zhuang, Shenzhen (CN); Qiang Gu, Beijing (CN); Wulong Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 552 days.

(21) Appl. No.: 17/134,858

(22) Filed: Dec. 28, 2020

(65) Prior Publication Data

US 2021/0114587 A1  Apr. 22, 2021

Related U.S. Application Data

(63) Continuation of application No. PCT/CN2019/092722, filed on Jun. 25, 2019.

(30) Foreign Application Priority Data

Jun. 29, 2018  (CN) .......................... 201810696037.0

(51) Int. Cl.
*B60W 30/06* (2006.01)
*B60W 60/00* (2020.01)

(52) U.S. Cl.
CPC .......... *B60W 30/06* (2013.01); *B60W 60/001* (2020.02); *B60W 2510/20* (2013.01)

(58) Field of Classification Search
CPC .......................... B60W 30/06; B62D 15/0285
See application file for complete search history.

(56) References Cited

U.S. PATENT DOCUMENTS

| | | | |
|---|---|---|---|
| 2013/0166190 A1 | 6/2013 | Ikeda et al. | |
| 2016/0200359 A1* | 7/2016 | Boeck .................. | B62D 15/027 701/41 |
| 2017/0096168 A1* | 4/2017 | Yang ........................ | G08G 1/14 |

FOREIGN PATENT DOCUMENTS

| | | |
|---|---|---|
| CN | 102602391 A | 7/2012 |
| CN | 104260722 A | 1/2015 |

(Continued)

*Primary Examiner* — Adam R Mott
*Assistant Examiner* — Elizabeth Rose Neleski
(74) *Attorney, Agent, or Firm* — HUAWEI TECHNOLOGIES CO., LTD.

(57) ABSTRACT

This application provides a method for determining an automatic parking strategy. The method includes: determining, a target parking action corresponding to a current parking stage performing the target parking action; obtaining feedback information, where the feedback information is used to indicate whether a result of performing the target parking action reaches a predetermined objective, and the predetermined objective is a predetermined position of the vehicle relative to a target parking spot, and/or the predetermined objective is a status of the vehicle in the parking process; and updating the automatic parking strategy based on the feedback information. In the foregoing method, the entire parking process is divided into several parking stages, and a control strategy is obtained by using a different method at each stage. This can increase a success rate of automatic parking in a complex parking scenario.

18 Claims, 9 Drawing Sheets

Ego-vehicle

(56) References Cited

FOREIGN PATENT DOCUMENTS

| | | | |
|---|---|---|---|
| CN | 104627175 | A | 5/2015 |
| CN | 105197010 | A | 12/2015 |
| CN | 105764773 | A | 7/2016 |
| CN | 105857306 | A | 8/2016 |
| CN | 106627565 | A | 5/2017 |
| CN | 105109482 | B | 9/2017 |
| CN | 107792062 | A | 3/2018 |
| CN | 108121205 | A | 6/2018 |
| CN | 108407805 | A | 8/2018 |
| CN | 109895764 | A | 6/2019 |
| DE | 102008027779 | A1 | 12/2009 |
| EP | 2462015 | A1 | 6/2012 |
| EP | 3153384 | A1 | 4/2017 |
| WO | 2010098170 | A1 | 9/2010 |

* cited by examiner

METHOD AND APPARATUS FOR DETERMINING AUTOMATIC PARKING STRATEGY

CROSS-REFERENCE TO RELATED APPLICATIONS

This application is a continuation of International Application No. PCT/CN2019/092722, filed on Jun. 25, 2019, which claims priority to Chinese Patent Application No. 201810696037.0, filed on Jun. 29, 2018. The disclosures of the aforementioned applications are hereby incorporated by reference in their entireties.

TECHNICAL FIELD

Embodiments of the application relates to the self-driving field, and in particular, to a method and an apparatus for determining an automatic parking strategy.

BACKGROUND

An automatic parking system is a system by which a vehicle can automatically drive to a parking spot in a parallel manner, a vertical manner, or an angle manner. A core idea of the system is to plan a steering angle and a speed that are of the vehicle, so as to obtain an ideal parking path that can be followed within limited driving space. For example, an in-vehicle processor performs calculation and performs a series of control actions, in real time according to a parking strategy by using sensor data from a vehicle servo system and data of a distance between the vehicle and an obstacle, so that the vehicle drives to the parking spot.

In an available automatic parking method, different parking scenarios (for example, different aisle widths, a size of a target parking spot, and a start pose of an ego-vehicle) are solved, to obtain an available control strategy. For example, a parking path is planned through circular arc planning or by using a vector field, to obtain the available control strategy.

The foregoing method has a comparatively strong generalization capability. However, for some complex parking scenarios, it is difficult to obtain a satisfactory result by using the foregoing method. For example, circular arc planning has a comparatively high requirement for parking space and cannot be implemented in some narrow parking space, and a solution calculated by using the vector field cannot ensure convergence. Consequently, it is difficult to implement automatic parking in a complex parking scenario.

SUMMARY

This application provides a method and an apparatus for determining an automatic parking strategy. An entire parking process is divided into several parking stages, and a control strategy is obtained by using a different method at each stage. This can increase a success rate of automatic parking in a complex parking scenario.

According to a first aspect, a method for determining an automatic parking strategy is provided, and includes: determining, according to an automatic parking strategy, a target parking action corresponding to a current parking stage, where the current parking stage is one of a plurality of parking stages included in a parking process of a vehicle; performing the target parking action; obtaining feedback information, where the feedback information is used to indicate whether a result of performing the target parking action reaches a predetermined objective, and the predetermined objective is a predetermined position of the vehicle relative to a target parking spot, and/or the predetermined objective is a status of the vehicle in the parking process; and updating the automatic parking strategy based on the feedback information.

A device for performing the method is, for example, an in-vehicle processor. The in-vehicle processor may divide the parking process of the vehicle into three stages. For example, an included angle between a longitudinal axis of the vehicle and a longitudinal axis of the target parking spot is first adjusted to be less than 60 degrees, the included angle is then adjusted to be less than 30 degrees, and the included angle is then adjusted to be less than 5 degrees. When the included angle is less than 5 degrees, it may be considered that parking succeeds. Compared with a solution in which the included angle is directly adjusted to be less than 5 degrees in a load parking scenario, reaching a predetermined objective at each of the stages according to this embodiment reduces implementation difficulty, and obtaining an automatic parking strategy at each stage can be much easier, thereby improving a success rate of automatic parking in a complex parking scenario.

In one embodiment, before the determining, according to an automatic parking strategy, a target parking action corresponding to a current parking stage, the method further includes: determining the current parking stage based on an included angle between a preset direction of the vehicle and a reference direction, where there is a preset correspondence between the current parking stage and the included angle.

Usually, parking cannot be considered to be successful when the vehicle drives to the target parking spot, and that the included angle between the preset direction (for example, a longitudinal axis direction) of the vehicle and the reference direction (for example, a longitudinal axis direction of the target parking spot) is less than an included angle threshold further needs to be determined, so as to determine that the vehicle is parked successfully. Therefore, a current parking stage can be accurately determined based on a result of comparison between the included angle threshold and the included angle between the preset direction of the vehicle and the reference direction.

In one embodiment, the preset direction of the vehicle is the longitudinal axis direction of the vehicle, the reference direction is the longitudinal axis direction of the target parking spot, and the included angle is an acute angle or a right angle.

When the vehicle is parked successfully, the longitudinal axis of the vehicle is parallel to or approximately parallel to the longitudinal axis of the target parking spot. Therefore, whether the vehicle is parked successfully can be more easily determined by using the longitudinal axis of the vehicle as the preset direction of the vehicle and using the longitudinal axis of the target parking spot as the reference direction.

In one embodiment, the determining the current parking stage based on an included angle between a preset direction of the vehicle and a reference direction includes: when the included angle is greater than or equal to a first included angle threshold, determining that the current parking stage is an initial stage, where the first included angle threshold is less than 90 degrees.

The first included angle threshold may be a threshold specified based on expert experience. When the included angle is greater than or equal to the first included angle threshold, it indicates that there is a comparatively large difference between a pose of the vehicle in this case and a pose used when parking is completed. Therefore, it can be determined that the vehicle is at the initial stage in this case, and the pose of the vehicle is adjusted based on a target parking action at the initial stage, so that the vehicle reaches a predetermined objective at the initial stage, to perform an action at a next stage.

In one embodiment, the target parking action at the initial stage is driving to the target parking spot at a first steering angle, where the first steering angle is less than a maximum steering angle of the vehicle; and the predetermined objective at the initial stage is that the included angle is less than or equal to the first included angle threshold and the vehicle enters the target parking spot.

Both the target parking action and the predetermined objective at the initial stage may be specified based on expert experience. The first steering angle may be a comparatively large angle, so that the vehicle is quickly adjusted to reach the predetermined objective.

In one embodiment, the automatic parking strategy is determining, as the target parking action, a parking action with a highest value in a plurality of parking actions corresponding to the current parking stage; and the updating the automatic parking strategy based on the feedback information includes: when the feedback information is the included angles at two adjacent moments, and an absolute value of a difference between the included angles at the two adjacent moments is greater than a preset included angle threshold, reducing a value of the target parking action.

A value of a parking action is directly proportional to a probability that the parking action becomes the target parking action. For the determined target parking action, a value obtained after the target parking action is completed is determined by using the feedback information and according to a preset value increase/reduction rule, so that whether the target parking action is suitable for the current parking stage can be checked. Each time the target parking action is completed, the processor updates a self-driving strategy, and determines a parking action with a highest value again, so that the self-driving strategy is continuously improving.

In one embodiment, the determining the current parking stage based on an included angle between a preset direction of the vehicle and a reference direction includes: when the included angle is greater than a second included angle threshold and less than the first included angle threshold, determining that the current parking stage is a transition stage, where both the first included angle threshold and the second included angle threshold are less than 90 degrees, and the second included angle threshold is less than the first included angle threshold.

The first included angle threshold and the second included angle threshold may be thresholds specified based on expert experience, and the first included angle threshold is a value less than 90 degrees. When the included angle is greater than the second included angle threshold and less than the first included angle threshold, it indicates that a pose of the vehicle in this case has been adjusted to an appropriate pose. Therefore, it can be determined that the vehicle is at the transition stage in this case, and the pose of the vehicle is adjusted based on a target parking action at the transition stage, so that the vehicle reaches a predetermined objective at the transition stage, to perform an action at a next stage.

In one embodiment, the target parking action at the transition stage is driving to the target parking spot at a second steering angle, where the second steering angle is equal to the maximum steering angle of the vehicle; and the predetermined objective at the transition stage is that the included angle is less than or equal to the second included angle threshold and the vehicle enters the target parking spot.

Both the target parking action and the predetermined objective at the transition stage may be specified based on expert experience. Because the pose of the vehicle has been adjusted to the appropriate pose at the initial stage, the second steering angle may be the maximum steering angle of the vehicle, so that the vehicle is quickly adjusted to reach the predetermined objective.

In one embodiment, the automatic parking strategy is determining, as the target parking action, a parking action with a highest value in a plurality of parking actions corresponding to the current parking stage; and the updating the automatic parking strategy based on the feedback information includes: when the feedback information is $\theta_1$ and $\theta_{t-1}$, and $|\theta_t|<|\theta_{t-1}|$, increasing the value of the target parking action based on $\downarrow_t$ and $\theta_{t-1}$, where $\theta_t$ and $\theta_{t-1}$ are the included angles at the two adjacent moments, $|\theta_t|\neq 0$, and the value of the target parking action is directly proportional to $$\frac{|\theta_{t-1}|}{|\theta_t|}.$$

A value of a parking action is directly proportional to a probability that the parking action becomes the target parking action. For the determined target parking action, a value obtained after the target parking action is completed is determined by using the feedback information and according to a preset value increase/reduction rule, so that whether the target parking action is suitable for the current parking stage can be checked. Each time the target parking action is completed, the processor updates a self-driving strategy, and determines a parking action with a highest value again, so that the self-driving strategy is continuously improving.

In one embodiment, the determining the current parking stage based on an included angle between a preset direction of the vehicle and a reference direction includes: when the included angle is less than or equal to the second included angle threshold, determining that the current parking stage is a fine-tuning stage, where the second included angle threshold is less than 90 degrees.

The second included angle threshold may be a threshold specified based on expert experience, and the second included angle threshold is a value less than 90 degrees. When the included angle is less than or equal to the second included angle threshold, it indicates that there is a little difference between a pose of the vehicle in this case and a pose used when parking succeeds. Therefore, it can be determined that the vehicle is at the fine-tuning stage, and the pose of the vehicle is adjusted based on a target parking action at the fine-tuning stage, so that the vehicle reaches a predetermined objective at the fine-tuning stage to complete parking.

In one embodiment, the target parking action at the fine-tuning stage is driving to the target parking spot at a third steering angle, where the third steering angle is less than the maximum steering angle of the vehicle; and the predetermined objective at the fine-tuning stage is that the included angle is less than or equal to a third included angle threshold and the vehicle enters the target parking spot position, where the third included angle threshold is less than the second included angle threshold.

Both the target parking action and the predetermined objective at the fine-tuning stage may be specified based on expert experience. Because there is a little difference between the pose of the vehicle at the fine-tuning stage and the pose of the vehicle that is used when parking succeeds, the third steering angle may be a comparatively small angle, to reach the predetermined objective.

In one embodiment, the automatic parking strategy is determining, as the target parking action, the parking action with the highest value in the plurality of parking actions corresponding to the current parking stage; and the updating the automatic parking strategy based on the feedback information includes: when the feedback information is $d_t$, $d_{t-1}$, $\theta_t$, and $\theta_{t-1}$, and $|d_t|<|d_{t-1}|$ and $|\theta_t|<|\theta_{t-1}|$, increasing the value of the target parking action based on $d_t$ and $d_{t-1}$, where $d_t$ and $d_{t-1}$ are Euclidean distances between the vehicle and the target parking spot at the two adjacent moments, $\theta_t$ and $\theta_{t-1}$ are the included angles at the two adjacent moments, $|d_t|\neq 0$, and the value of the target parking action is directly proportional to $$\frac{|d_{t-1}|}{|d_t|}.$$

A value of a parking action is directly proportional to a probability that the parking action becomes the target parking action. For the determined target parking action, a value obtained after the target parking action is completed is determined by using the feedback information and according to a preset value increase/reduction rule, so that whether the target parking action is suitable for the current parking stage can be checked. Each time the target parking action is completed, the processor updates a self-driving strategy, and determines a parking action with a highest value again, so that the self-driving strategy is continuously improving.

In one embodiment, the updating the automatic parking strategy based on the feedback information further includes: when the feedback information is that a collision and/or an out-of-bounds case occur/occurs in a process of performing the target parking action, reducing the value of the target parking action; and/or when the feedback information is that the predetermined objective is reached, increasing the value of the target parking action.

If a collision and/or an out-of-bounds case occur/occurs in the parking process, it indicates that the target parking action is not applicable to the current parking stage, and the value of the target parking action needs to be reduced. If the predetermined objective is reached after the target parking action is performed, it indicates that the target parking action is desirable, and the value of the target parking action needs to be increased.

According to a second aspect, an apparatus for determining an automatic parking strategy is provided. The apparatus may implement functions corresponding to the steps in the method in the first aspect, and the functions may be implemented by hardware, or may be implemented by hardware executing corresponding software. The hardware or software includes one or more units or modules corresponding to the foregoing functions.

In a possible design, the apparatus includes a processor and a communications interface. The processor is configured to support the apparatus to perform a corresponding function in the method in the first aspect. The communications interface is configured to support communication between the apparatus and another network element. The apparatus may further include a memory. The memory is configured to couple to the processor, and stores a program instruction and data that are necessary for the apparatus.

According to a third aspect, a computer-readable storage medium is provided. The computer-readable storage medium stores computer program code, and when the computer program code is executed by a processing unit or a processor, an apparatus for determining an automatic parking strategy is enabled to perform the method described in the first aspect.

According to a fourth aspect, a computer program product is provided. The computer program product includes computer program code, and when the computer program code is run by a communications unit or a communications interface and a processing unit or a processor that are of an apparatus for determining an automatic parking strategy, the apparatus for determining an automatic parking strategy is enabled to perform the method in the first aspect.

DESCRIPTION OF EMBODIMENTS

The following describes technical solutions of this application with reference to accompanying drawings.

Figure 1:
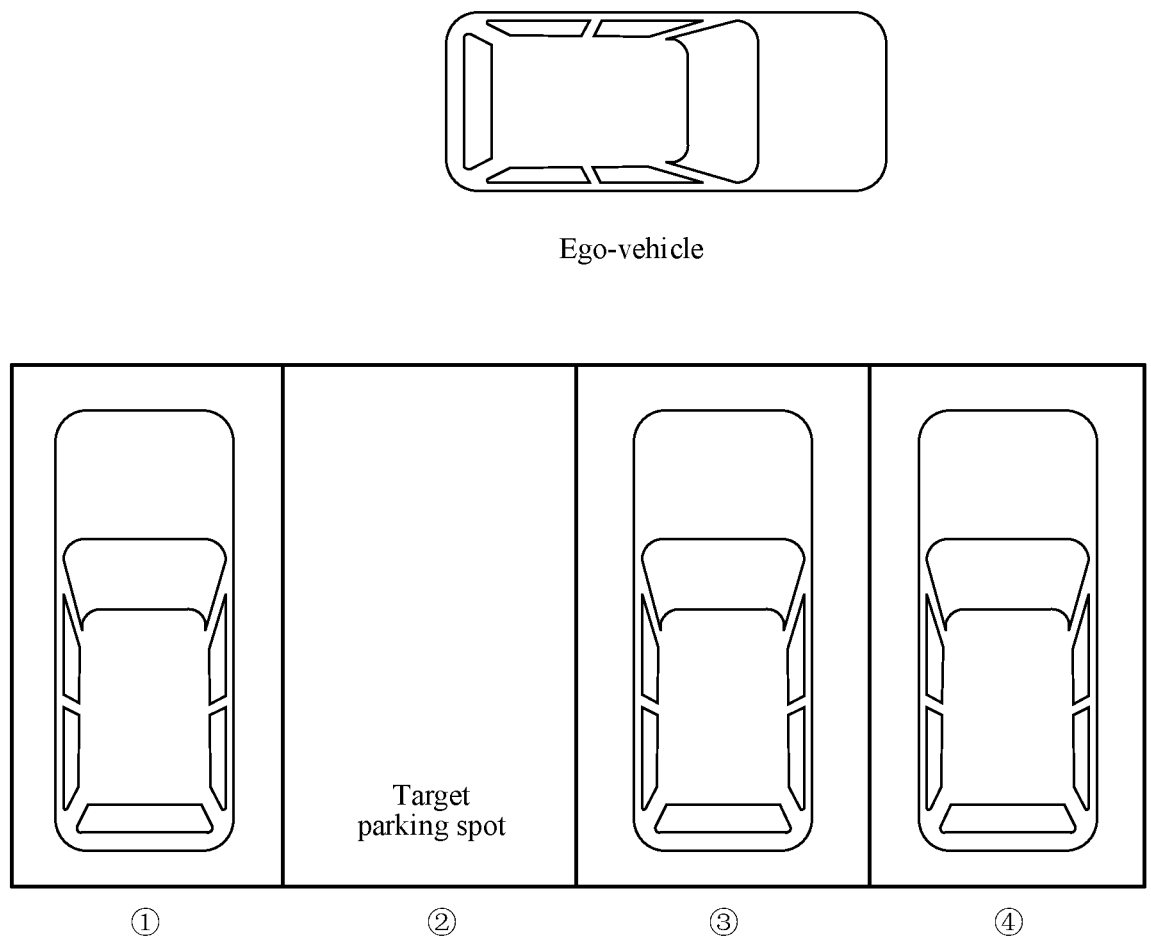
FIG. 1 is a schematic diagram of an automatic parking scenario applicable to this application.

FIG. 1 is a schematic diagram of an automatic parking scenario applicable to this application. The parking scenario shown in FIG. 1 includes four parking spots and four cars. Three cars occupy three parking spots, and a fourth car (referred to as an "ego-vehicle") needs to drive from a position shown in FIG. 1 to the remaining one (namely, a target parking spot) of the four parking spots, and is prevented from colliding with another vehicle in the driving process.

Figure 2:
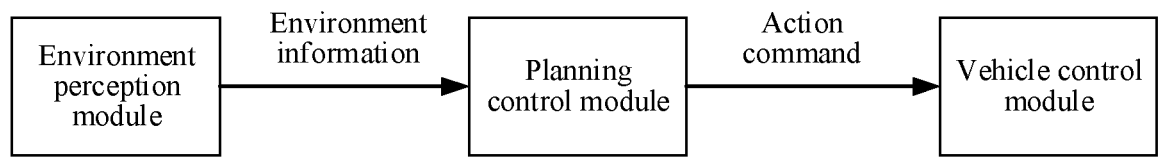
FIG. 2 is a schematic diagram of an automatic parking procedure according to this application.

An environment perception module, a planning control module, and a vehicle control module are installed in the ego-vehicle. The environment perception module is configured to measure environment information such as a position and an orientation that are of the ego-vehicle, a position of the target parking spot, and a distance between the ego-vehicle and an obstacle (including the another vehicle). The planning control module (for example, an in-vehicle processor) is configured to: determine a target parking action according to an automatic parking strategy and based on the environment information obtained by the environment perception module through measurement, and output an action command corresponding to the target parking action. The vehicle control module controls, according to the action command that is output by the planning control module, the ego-vehicle to bypass the obstacle and drive to the target parking spot, so as to complete automatic parking. The foregoing automatic parking procedure is shown in FIG. 2.

Usually, more obstacles around an ego-vehicle indicate a more complex parking environment and higher difficulty in determining an automatic parking strategy. Fewer obstacles around an ego-vehicle indicate a simpler parking environment and lower difficulty in determining an automatic parking strategy. A method for determining an automatic parking strategy according to this application is described below with reference to FIG. 3A and FIG. 3B.

Figure 3A:
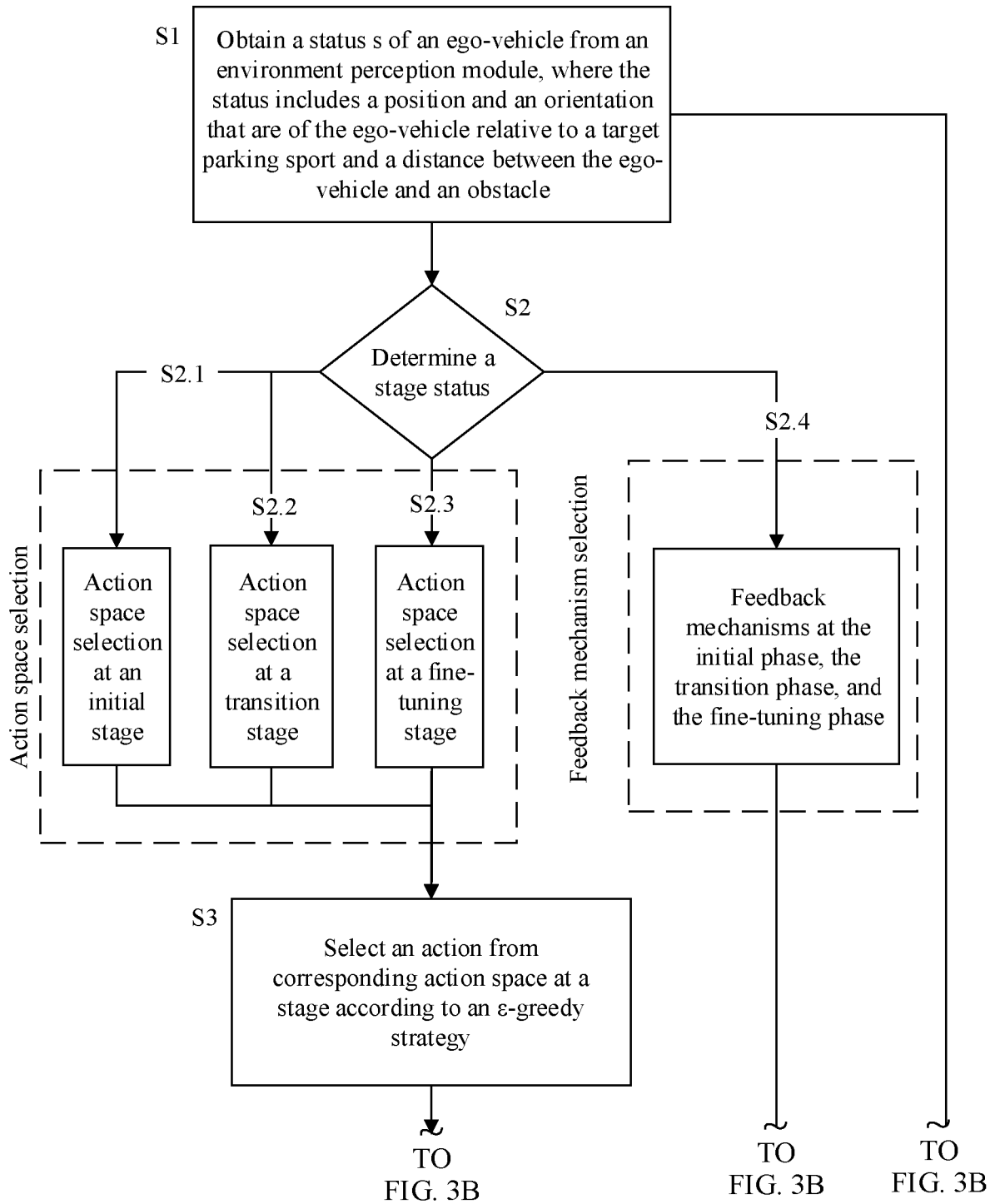
FIG. 3A and FIG. 3B are a schematic diagram of another automatic parking procedure according to this application.
Figure 3B:
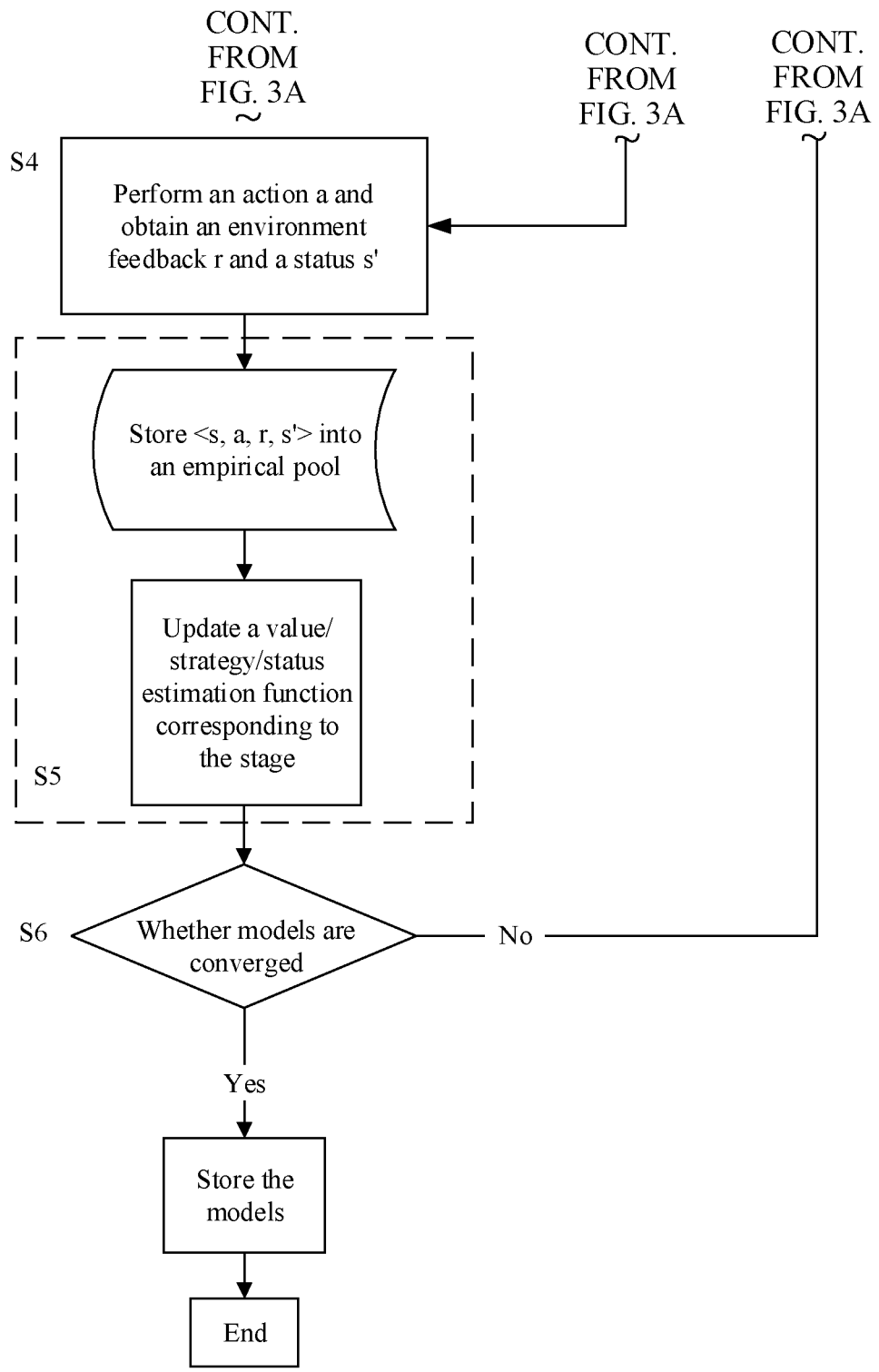

As shown in FIG. 3A and FIG. 3B, the procedure for determining an automatic parking strategy according to this application includes the following steps:

S1. The planning control module obtains status information of an ego-vehicle from the environment perception module. The status information includes a position and an orientation that are of the ego-vehicle relative to a target parking spot and information about a distance between the ego-vehicle and a surrounding obstacle.

S2. Determine, based on the status information of the ego-vehicle, a parking stage of the ego-vehicle, and adaptively define corresponding action space and a corresponding environment feedback mechanism based on a characteristic of a current parking stage.

S2.1. A stage 1 is an initial stage and has an objective of adjusting the ego-vehicle to an ideal start pose.

S2.2. A stage 2 is a transition stage and has an objective of adjusting a pose of the ego-vehicle to a target parking pose by fully using space.

S2.3. A stage 3 is a fine-tuning stage and has an objective of adjusting the pose of the ego-vehicle to an ideal parking pose through fine-tuning.

S2.4. Obtain, based on the stage objectives in S2.1 to S2.3, action space applicable to different stages, and define environment feedback functions at the different stages. The action space is a set of a plurality of parking actions (for example, A1, A2, and A3). The planning control module selects, based on the current parking stage, one parking action (for example, the action A1) from the set as a target parking action at the current parking stage. The environment feedback function is used to determine a value of the action A1, in one embodiment, determine whether the action A1 can continue to be used as the target parking action.

S3. Select, by using a reinforcement learning-based approach, an expected action from the action space defined in S2, for example, select, by using an ε-greedy strategy in a deep Q-learning neural network (deep Q-network, DQN), the target parking action from the action space defined in S2. A probability that a parking action is randomly selected as the target parking action from the action space defined in S2 is ε, and a probability that a current parking action corresponding to a maximum Q value is randomly selected as the target parking action from the action space defined in S2 is −ε.

S4. Perform the action selected in S3, and obtain environment feedback according to the environment feedback mechanism defined in S2, in one embodiment, obtain an instant evaluation signal used to evaluate the target parking action. For example, a negative feedback is given if a collision occurs after the target parking action is completed, or a positive feedback is given if a stage objective is reached.

S5. Store the information obtained in S2, S3, and S4; and update, in a mini-batch stochastic gradient descent manner, reinforcement learning models corresponding to the different stages. The models corresponding to the three stages are obtained through cascade training.

S6. Determine whether the model corresponding to the stages are converged. In this step, determining needs to be performed based on a success rate that is of reaching a stage objective and that is of a model in an application mode, smoothness of trajectories obtained after all parking actions are completed, and another possible evaluation criterion. This is not particularly limited herein.

Based on the foregoing procedure, the following describes in detail a method for determining an automatic parking strategy according to this application.

Figure 4:
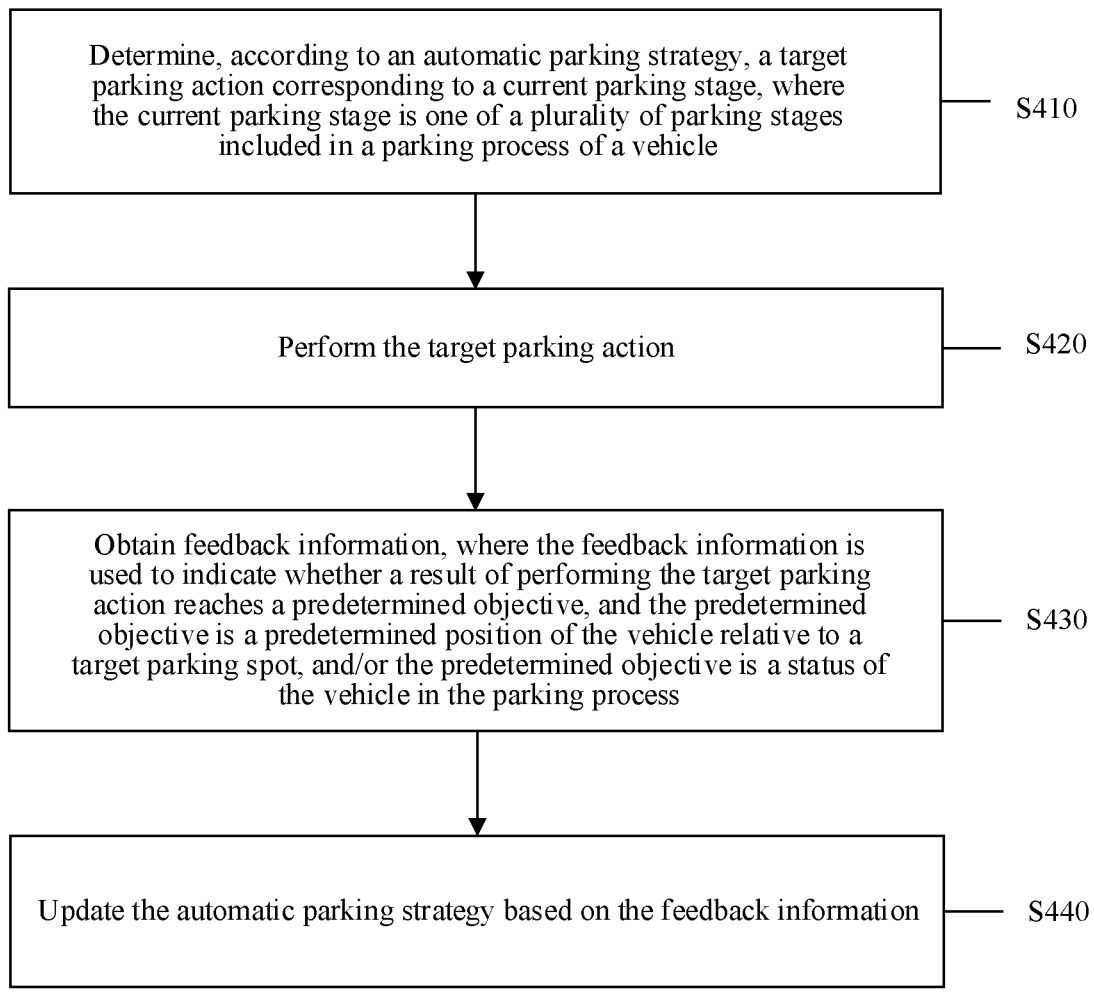
FIG. 4 is a schematic diagram of a method for determining an automatic parking strategy according to this application.

As shown in FIG. 4, a device for performing the method 400 may be an in-vehicle processor, or may be a vehicle including a processor, or may be a server. The device for performing the method 400 is not limited in this application. The method 400 includes the following steps.

S410. Determine, according to an automatic parking strategy, a target parking action corresponding to a current parking stage, where the current parking stage is one of a plurality of parking stages included in a parking process of a vehicle.

The parking process may be divided into two parking stages, or the parking process may be divided into three parking stages. A quantity of the plurality of parking stages may alternatively be another value. It should be noted that, the parking process is a complete parking process. In an optional example, the vehicle (also referred to as an "ego-vehicle") may complete parking without going through the complete parking process. For example, a complete parking process is divided into an initial stage and a fine-tuning stage based on an included angle between a longitudinal axis of the vehicle and a longitudinal axis of a target parking spot. The included angle at the initial stage is larger, and the included angle at the fine-tuning stage is smaller. After entering a garage, the vehicle determines that the target parking spot is right in front of the vehicle, that is, the included angle between the longitudinal axis of the vehicle and the longitudinal axis of the target parking spot is comparatively small. In this case, the vehicle can directly enter the fine-tuning stage.

The automatic parking strategy may be selecting, from a parking action set corresponding to the current parking stage, an appropriate parking action as the target parking action. For example, the parking action is controlling a steering angle and a speed, the appropriate parking action is a parking action with a highest value in the parking action set, or the appropriate parking action is a least time-consuming parking action in the parking action set when no collision occurs. Alternatively, the automatic parking strategy may be a target parking action determined in real time based on the current parking stage, for example, a target parking action determined through circular arc planning or by using a vector field. The automatic parking strategy is not limited in this application.

S420. Perform the target parking action.

A processor outputs an action instruction corresponding to the target parking action, to perform the target parking action.

S430. Obtain feedback information, where the feedback information is used to indicate whether a result of performing the target parking action reaches a predetermined objective, and the predetermined objective is a predetermined position of the vehicle relative to the target parking spot, and/or the predetermined objective is a status of the vehicle in the parking process.

The feedback information may be a distance between the ego-vehicle and an obstacle, or may be a relative position between the ego-vehicle and the target parking spot, or may be that "the predetermined objective is reached" or "the predetermined objective is not reached". For example, the predetermined objective is to complete parking, and when the feedback information is that a distance between the ego-vehicle and a vehicle (namely, the obstacle) near a parking spot is less than 50 centimeters, the processor may determine, based on the feedback information, that performing the target parking action by the ego-vehicle reaches the predetermined objective. For another example, the predetermined objective is to complete parking, and when the feedback information is that the ego-vehicle completely enters the target parking spot, the processor may determine, based on the feedback information, that performing the target parking action by the ego-vehicle reaches the predetermined objective.

The predetermined objective and the feedback information may alternatively be other content. For example, the predetermined objective is a small discrete steering angle, and the feedback information is a steering angle at each moment. If the steering angle at each moment is less than or equal to the steering angle specified by the predetermined objective, the processor determines, based on the feedback information, that performing the target parking action by the ego-vehicle reaches the predetermined objective; otherwise, the processor determines that performing the target parking action by the ego-vehicle does not reach the predetermined objective.

It should be noted that S420 and S430 may be performed in an actual parking process, or may be performed in a simulator or a simulation environment.

S440. Update the automatic parking strategy based on the feedback information.

If the feedback information indicates that performing the target parking action reaches the predetermined objective, it indicates that the target parking action is applicable to the current parking stage, and a value of the target parking action may be increased, so that the target parking action more easily matches the current parking stage, that is, the automatic parking strategy is updated. If the feedback information indicates that performing the target parking action does not reach the predetermined objective, it indicates that the target parking action is not applicable to the current parking stage, and a value of the target parking action may be reduced, so that the target parking action does not easily match the current parking stage, that is, the automatic parking strategy is updated.

To sum up, compared with a method for determining an automatic parking strategy by using the complete parking process as an objective, the method 400 divides the parking process of the vehicle into at least two stages, so that difficulty in reaching an objective at each stage is reduced, and obtaining an automatic parking strategy corresponding to the complete parking process is much easier, thereby increasing a success rate of automatic parking in a complex parking scenario.

In one embodiment, before S410, the method 400 further includes:

determining the current parking stage based on an included angle between a preset direction of the vehicle and a reference direction, where there is a preset correspondence between the current parking stage and the included angle.

Usually, parking cannot be considered to be successful when the vehicle drives to the target parking spot, and that the included angle between the preset direction (for example, a longitudinal axis direction) of the vehicle and the reference direction (for example, a longitudinal axis direction of the target parking spot) is less than an included angle threshold further needs to be determined, so as to determine that the vehicle is parked successfully. Therefore, a current parking stage can be accurately determined based on a result of comparison between the included angle threshold and the included angle between the preset direction of the vehicle and the reference direction.

Alternatively, a current parking stage of the parking process may be determined in another manner (for example, a distance between the vehicle and the target parking spot). This is not limited in this application.

In one embodiment, the preset direction of the vehicle is the longitudinal axis direction of the vehicle, the reference direction is the longitudinal axis direction of the target parking spot, and the included angle between the longitudinal axis direction of the vehicle and the longitudinal axis direction of the target parking spot is an acute angle or a right angle.

A projection of the vehicle on the ground is usually a rectangle, and the longitudinal axis of the vehicle is a direction of a long side of the rectangle of the vehicle. The longitudinal axis of the vehicle may alternatively be defined in another manner, for example, a perpendicular bisector of a connecting line between two front wheels of the vehicle, or a direction facing the driver, or a direction in which a car drives in a straight line. The target parking spot is usually also a rectangle, and the longitudinal axis of the target parking spot may be defined as a direction of a long side of the rectangle.

When the vehicle is parked successfully, the longitudinal axis of the vehicle is parallel to or approximately parallel to the longitudinal axis of the target parking spot. Therefore, whether the vehicle is parked successfully can be more easily determined by using the longitudinal axis of the vehicle as the preset direction of the vehicle and using the longitudinal axis of the target parking spot as the reference direction.

In one embodiment, the determining the current parking stage based on an included angle between a preset direction of the vehicle and a reference direction includes:

when the included angle is greater than or equal to a first included angle threshold, determining that the current parking stage is an initial stage, where the first included angle threshold is less than 90 degrees.

The first included angle threshold may be a threshold specified based on expert experience. When the included angle is greater than or equal to the first included angle threshold, it indicates that there is a comparatively large difference between a pose of the vehicle in this case and a pose used when parking is completed. Therefore, it can be determined that the vehicle is at the initial stage in this case, and the pose of the vehicle is adjusted based on a target parking action at the initial stage, so that the vehicle reaches a predetermined objective at the initial stage, to perform an action at a next stage.

In one embodiment, the target parking action at the initial stage is driving to the target parking spot at a first steering angle, where the first steering angle is less than a maximum steering angle of the vehicle; and the predetermined objective at the initial stage is that the included angle is less than or equal to the first included angle threshold and the vehicle enters the target parking spot.

Both the target parking action and the predetermined objective at the initial stage may be specified based on expert experience. The first steering angle may be a comparatively large angle, so that the vehicle is quickly adjusted to reach the predetermined objective.

Figure 5:
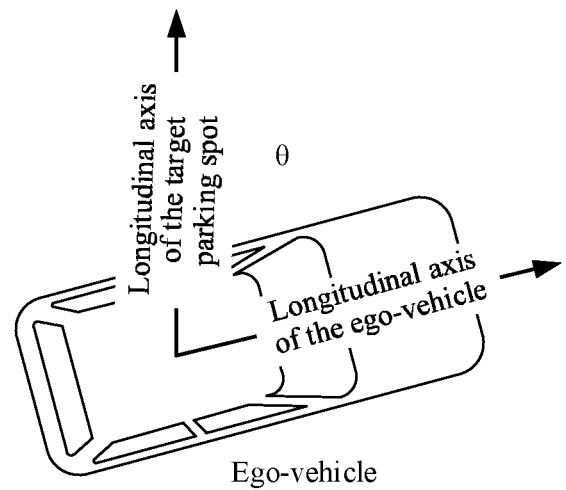
FIG. 5 is a schematic diagram of a pose of an ego-vehicle at an initial stage according to this application.
Figure 5:
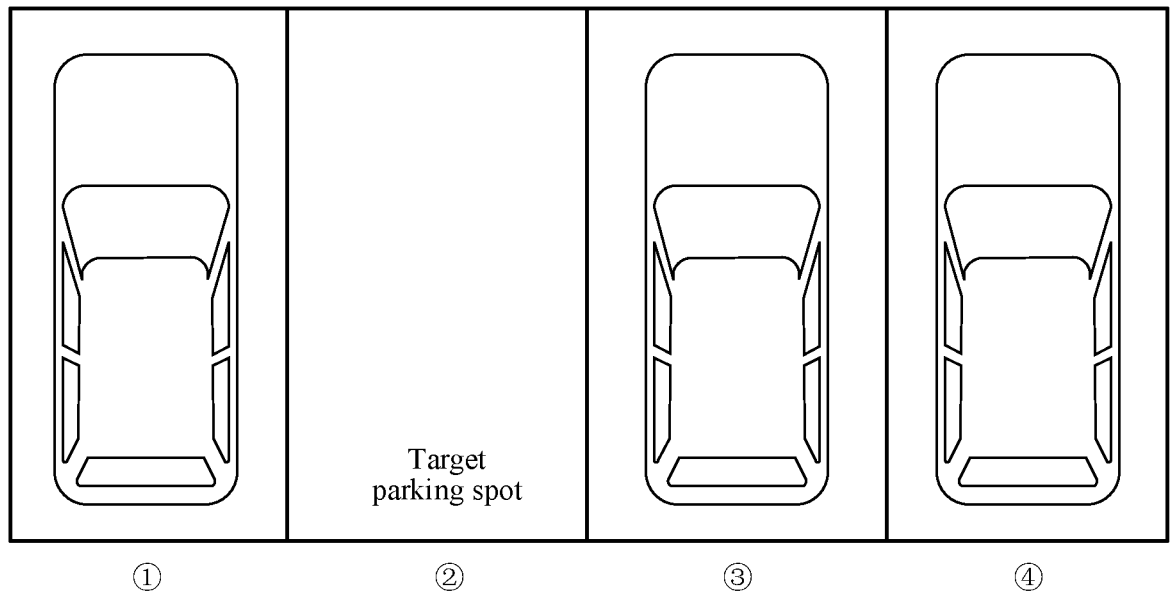

FIG. 5 is a schematic diagram of a pose of the ego-vehicle at the initial stage according to this application. The longitudinal axis of the ego-vehicle is the preset direction of the ego-vehicle, and the longitudinal axis of the target parking spot is the reference direction. If it is determined, based on expert experience, that the first included angle threshold is 60 degrees, and the included angle θ between the longitudinal axis of the ego-vehicle and the longitudinal axis of the target parking spot is 80 degrees, it is determined that the current parking stage is the initial stage. The first steering angle may be a comparatively small angle (for example, 5 degrees), so that a parking trajectory at the initial stage is much smoother.

After it is determined that the current parking stage is the initial stage, the target parking action may be determined according to an automatic parking strategy at the initial stage.

In one embodiment, the automatic parking strategy at the initial stage is determining, as the target parking action, a parking action with a highest value in a plurality of parking actions corresponding to the current parking stage; and the updating the automatic parking strategy based on the feedback information includes: when an absolute value of a difference between the included angles at two adjacent moments is greater than a preset included angle threshold, reducing a value of the target parking action; and/or when the feedback information is that a collision and/or an out-of-bounds case occur/occurs in a process of performing the target parking action, reducing the value of the target parking action; and/or when the feedback information is that the predetermined objective is reached, increasing the value of the target parking action.

A value of a parking action is directly proportional to a probability that the parking action becomes the target parking action. For the determined target parking action, a value obtained after the target parking action is completed is determined by using the feedback information and according to a preset value increase/reduction rule, so that whether the target parking action is suitable for the current parking stage can be checked. Each time the target parking action is completed, the processor updates a self-driving strategy, and determines a parking action with a highest value again, so that the self-driving strategy is continuously improving.

For example, when $\theta_t - \theta_{t-1} > 5°$, $0.05 * |\theta_t - \theta_{t-1}|$ is subtracted from the value of the target parking action, where $\theta_t$ and $\theta_{t-1}$ are the included angles (that is, the included angle between the longitudinal axis direction of the vehicle and the longitudinal axis direction of the target parking spot) at the two adjacent moments; when a collision and/or an out-of-bounds case occur/occurs in a process of performing the target parking action, 10 is subtracted from the value of the target parking action; when the predetermined objective is reached after the target parking action is performed, 10 is added to the value of the target parking action; or when another condition occurs in a process of performing the target parking action, the value of the target parking action is neither increased nor reduced.

The updating the automatic parking strategy based on the feedback information is an environment feedback mechanism at the initial stage. The feedback mechanism at the initial stage may further include another rule of increasing or reducing the value of the target parking action.

In one embodiment, the determining the current parking stage based on an included angle between a preset direction of the vehicle and a reference direction includes: when the included angle is greater than a second included angle threshold and less than the first included angle threshold, determining that the current parking stage is a transition stage, where both the first included angle threshold and the second included angle threshold are less than 90 degrees, and the second included angle threshold is less than the first included angle threshold.

The first included angle threshold and the second included angle threshold may be thresholds specified based on expert experience, and the first included angle threshold is a value less than 90 degrees. When the included angle is greater than the second included angle threshold and less than the first included angle threshold, it indicates that a pose of the vehicle in this case has been adjusted to an appropriate pose. Therefore, it can be determined that the vehicle is at the transition stage in this case, and the pose of the vehicle is adjusted based on a target parking action at the transition stage, so that the vehicle reaches a predetermined objective at the transition stage, to perform an action at a next stage.

In one embodiment, the target parking action at the transition stage is driving to the target parking spot at a second steering angle, where the second steering angle is equal to the maximum steering angle of the vehicle; and the predetermined objective at the transition stage is that the included angle is less than or equal to the second included angle threshold and the vehicle enters the target parking spot.

Both the target parking action and the predetermined objective at the transition stage may be specified based on expert experience. Because the pose of the vehicle has been adjusted to the appropriate pose at the initial stage, the second steering angle may be the maximum steering angle of the vehicle, so that the vehicle is quickly adjusted to reach the predetermined objective.

Figure 6:
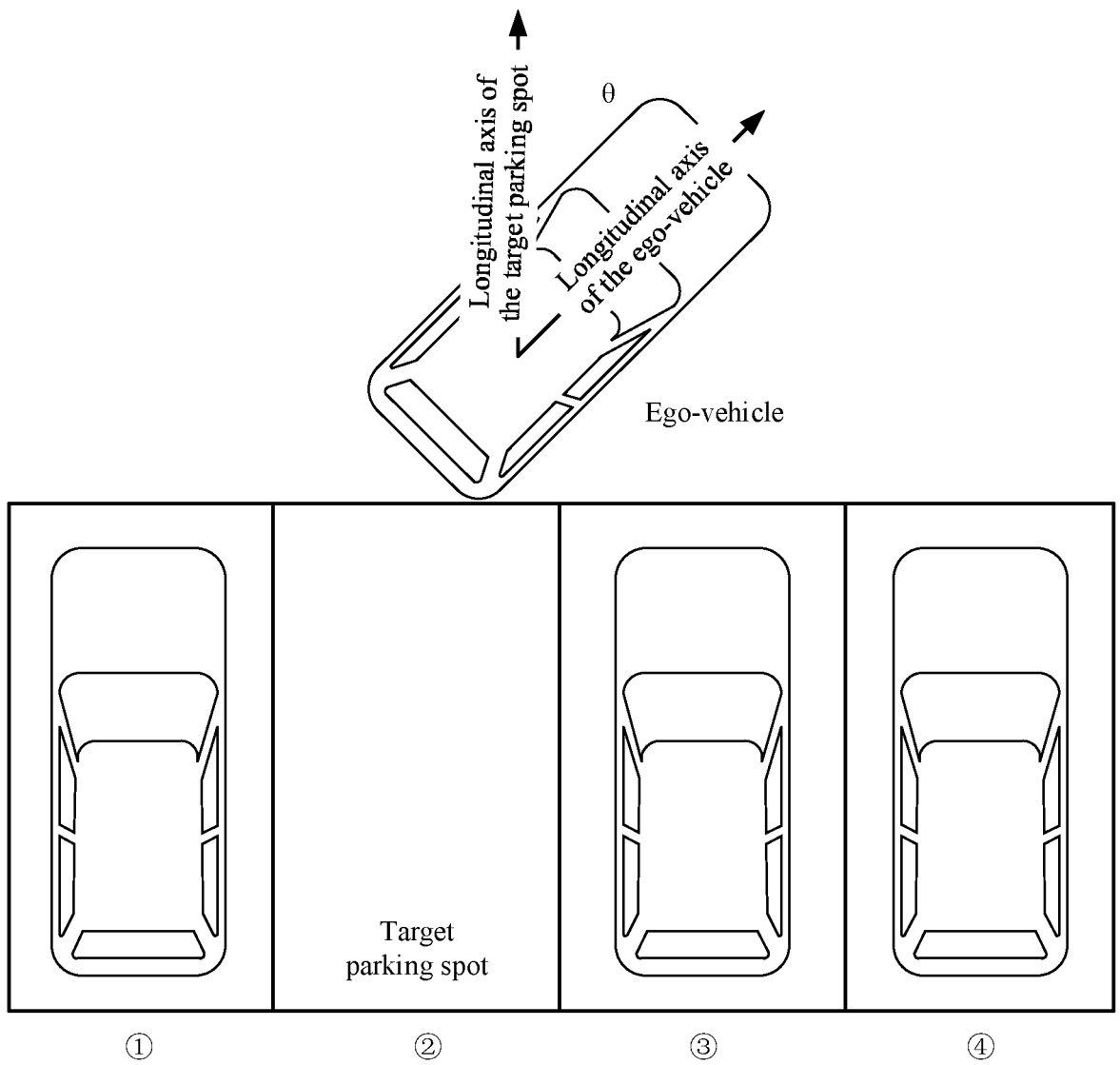
FIG. 6 is a schematic diagram of a pose of an ego-vehicle at a transition stage according to this application.

FIG. 6 is a schematic diagram of a pose of the ego-vehicle at the transition stage according to this application. The longitudinal axis of the ego-vehicle is the preset direction of the ego-vehicle, and the longitudinal axis of the target parking spot is the reference direction. If it is determined, based on expert experience, that the first included angle threshold is 60 degrees, the second included angle threshold is 10 degrees, and the included angle θ between the longitudinal axis of the ego-vehicle and the longitudinal axis of the target parking spot is 59 degrees, it is determined that the current parking stage is the transition stage. Because the pose of the vehicle at the transition stage is usually well adjusted, the first steering angle may be a steering angle corresponding to right full steering or left full steering, so that the vehicle can quickly enter a next stage from the transition stage, thereby improving parking efficiency.

After it is determined that the current parking stage is the transition stage, the target parking action may be determined according to an automatic parking strategy at the transition stage.

In one embodiment, the automatic parking strategy at the transition stage is determining, as the target parking action, a parking action with a highest value in a plurality of parking actions corresponding to the current parking stage; and the updating the automatic parking strategy based on the feedback information includes: when the feedback information $\theta_t$ and $\theta_{t-1}$, and $|\theta_t| < |\theta_{t-1}|$, increasing a value of the target parking action based on $\theta_t$ and $\theta_{t-1}$, where $\theta_t$ and $\theta_{t-1}$ are the included angles at the two adjacent moments, $|\theta_t| \neq 0$, and the value of the target parking action is directly proportional to $$\frac{|\theta_{t-1}|}{|\theta_t|};$$

and/or when the feedback information is that a collision and/or an out-of-bounds case occur/occurs in a process of performing the target parking action, reducing the value of the target parking action; and/or when the feedback information is that the predetermined objective is reached, increasing the value of the target parking action.

For example, when $$|\theta_t| < |\theta_{t-1}|, \frac{|\theta_{t-1}|}{|\theta_t|}$$

is added to the value of the target parking action; when a collision and/or an out-of-bounds case occur/occurs in a process of performing the target parking action, 10 is subtracted from the value of the target parking action; when the predetermined objective is reached after the target parking action is performed, 10 is added to the value of the target parking action; or when another condition occurs in a process of performing the target parking action, the value of the target parking action is neither increased nor reduced.

The updating the automatic parking strategy based on the feedback information is an environment feedback mechanism at the transition stage. The feedback mechanism at the transition stage may further include another rule of increasing or reducing the value of the target parking action.

In one embodiment, the determining the current parking stage based on an included angle between a preset direction of the vehicle and a reference direction includes:

when the included angle is less than or equal to the second included angle threshold, determining that the current parking stage is a fine-tuning stage, where the second included angle threshold is less than 90 degrees.

The second included angle threshold may be a threshold specified based on expert experience, and the second included angle threshold is a value less than 90 degrees. When the included angle is less than or equal to the second included angle threshold, it indicates that there is a little difference between a pose of the vehicle in this case and a pose used when parking succeeds. Therefore, it can be determined that the vehicle is at the fine-tuning stage, and the pose of the vehicle is adjusted based on a target parking action at the fine-tuning stage, so that the vehicle reaches a predetermined objective at the fine-tuning stage to complete parking.

In one embodiment, the target parking action at the fine-tuning stage is driving to the target parking spot at a third steering angle, where the third steering angle is less than the maximum steering angle of the vehicle; and the predetermined objective at the fine-tuning stage is that the included angle is less than or equal to a third included angle threshold and the vehicle enters the target parking spot position, where the third included angle threshold is less than the second included angle threshold.

Both the target parking action and the predetermined objective at the fine-tuning stage may be specified based on expert experience. Because there is a little difference between the pose of the vehicle at the fine-tuning stage and the pose of the vehicle that is used when parking succeeds, the third steering angle may be a comparatively small angle, to reach the predetermined objective.

Figure 7:
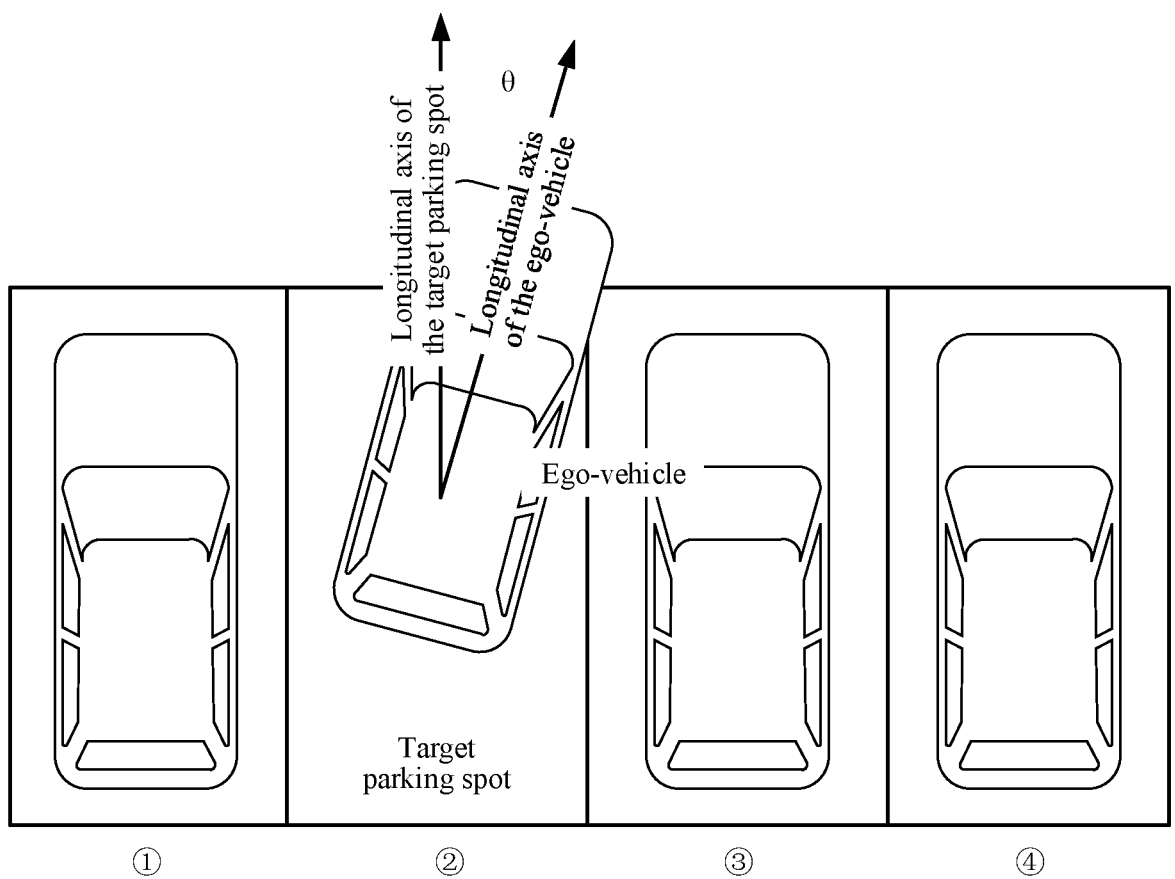
FIG. 7 is a schematic diagram of a pose of an ego-vehicle at a fine-tuning stage according to this application.

FIG. 7 is a schematic diagram of a pose of the ego-vehicle at the fine-tuning stage according to this application. The longitudinal axis of the ego-vehicle is the preset direction of the ego-vehicle, and the longitudinal axis of the target parking spot is the reference direction. If it is determined, based on expert experience, that the second included angle threshold is 10 degrees, and the included angle 0 between the longitudinal axis of the ego-vehicle and the longitudinal axis of the target parking spot is 9 degrees, it is determined that the current parking stage is the initial stage. The third steering angle may be a comparatively small angle (for example, 1 degree), so that a parking trajectory at the fine-tuning stage is much smoother.

After it is determined that the current parking stage is the fine-tuning stage, the target parking action may be determined according to an automatic parking strategy at the fine-tuning stage.

In one embodiment, the automatic parking strategy at the fine-tuning stage is determining, as the target parking action, a parking action with a highest value in a plurality of parking actions corresponding to the current parking stage; and the updating the automatic parking strategy based on the feedback information includes: when the feedback information is $d_t$, $d_{t-1}$, $\theta_t$, and $\theta_{t-1}$, and $|d_t|<|d_{t-1}|$ and $|\theta_t|<|\theta_{t-1}|$, increasing a value of the target parking action based on $d_t$ and $|\theta_{t-1}|$, where $d_t$ and $d_{t-1}$ are Euclidean distances between the vehicle and the target parking spot at the two adjacent moments, $\theta_t$ and $\theta_{t-1}$ are the included angles at the two adjacent moments, $|d_t|\neq 0$, and the value of the target parking action is directly proportional to $$\frac{|d_{t-1}|}{|d_t|};$$

and/or when the feedback information is that a collision and/or an out-of-bounds case occur/occurs in a process of performing the target parking action, reducing the value of the target parking action; and/or when the feedback information is that the predetermined objective is reached, increasing the value of the target parking action.

For example, when $|d_t|<|d_{t-1}|$ and $$|\theta_t| < |\theta_{t-1}|, \frac{|d_{t-1}|}{|d_t|}$$

is added to the value of the target parking action; when a collision and/or an out-of-bounds case occur/occurs in a process of performing the target parking action, 10 is subtracted from the value of the target parking action; when the predetermined objective is reached after the target parking action is performed, 10 is added to the value of the target parking action; or when another condition occurs in a process of performing the target parking action, the value of the target parking action is neither increased nor reduced.

The updating the automatic parking strategy based on the feedback information is an environment feedback mechanism at the fine-tuning stage. The feedback mechanism at the transition stage may further include another rule of increasing or reducing the value of the target parking action.

The foregoing describes in detail the examples of the method for determining an automatic parking strategy according to this application. It may be understood that, to implement the foregoing functions, an apparatus for determining an automatic parking strategy includes corresponding hardware structures and/or software modules for performing the functions. A person of ordinary skill in the art should be easily aware that units and algorithm steps in the examples described with reference to the embodiments disclosed in this specification may be implemented in a form of hardware or in a form of a combination of hardware and computer software in this application. Whether the functions are performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional unit division may be performed on the apparatus for determining an automatic parking strategy based on the foregoing method examples. For example, each functional unit may be obtained through division based on a corresponding function in a manner shown in FIG. 4, or two or more functions may be integrated into one processing unit. The integrated unit may be implemented in a form of hardware, or may be implemented in a form of a software functional unit. It should be noted that, in this application, unit division is an example, and is merely logical function division. During actual implementation, another division manner may be used.

Figure 8:
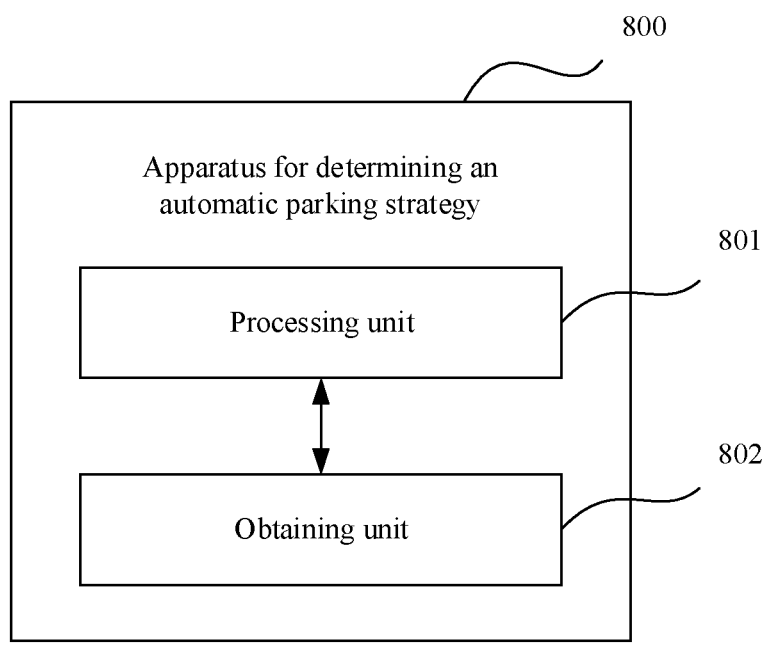
FIG. 8 is a schematic diagram of an apparatus for determining an automatic parking strategy according to this application.

When the integrated unit is used, FIG. 8 is a possible schematic structural diagram of the apparatus for determining an automatic parking strategy in the foregoing embodiment. The apparatus 800 for determining an automatic parking strategy includes a processing unit 801 and an obtaining unit 802. The processing unit 801 is configured to support the apparatus 800 for determining an automatic parking strategy to perform steps such as determining and updating shown in FIG. 4. The obtaining unit 802 is configured to obtain feedback information. The processing unit 801 and the obtaining unit 802 may further be configured to perform other processes in the technology described in this specification. The apparatus 800 may further include a storage unit, configured to store program code and data of the apparatus 800. Examples are as follows:

The processing unit 801 is configured to: determine, according to an automatic parking strategy, a target parking action corresponding to a current parking stage, where the current parking stage is one of a plurality of parking stages included in a parking process of a vehicle; and perform the target parking action.

The obtaining unit 802 is configured to obtain the feedback information, where the feedback information is used to indicate whether performing the target parking action reaches a predetermined objective.

The processing unit 801 is further configured to update the automatic parking strategy based on the feedback information.

The processing unit 801 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may be a combination for implementing a computing function, for example, a combination including one or more microprocessors or a combination of the DSP and a microprocessor. The obtaining unit 802 may be a transceiver or a communications interface. The storage unit may be a memory.

Figure 9:
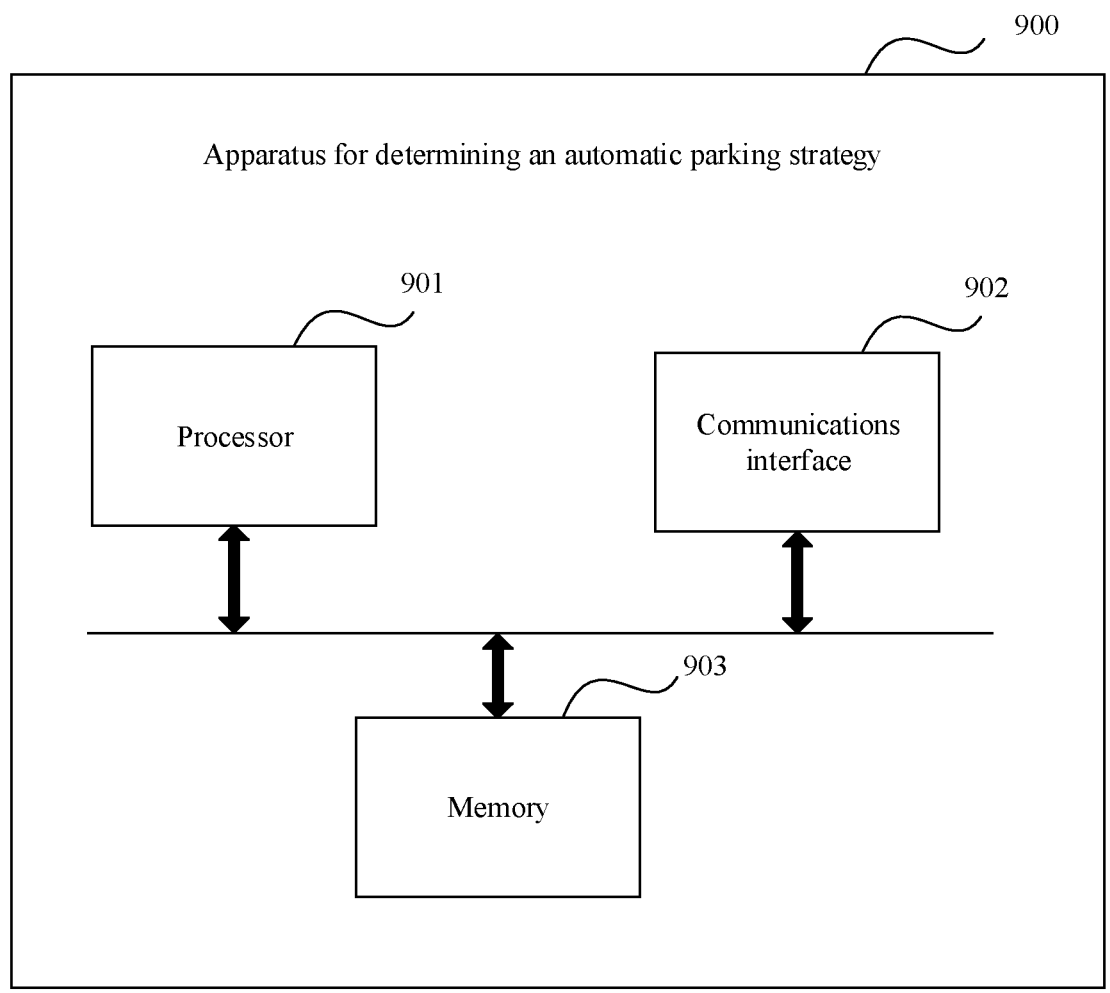
FIG. 9 is a schematic diagram of another apparatus for determining an automatic parking strategy according to this application.

When the processing unit 801 is a processor, the obtaining unit 802 is a communications interface, and the storage unit is a memory, the apparatus for determining an automatic parking strategy in this application may be an apparatus shown in FIG. 9.

As shown in FIG. 9, the apparatus 900 includes a processor 901, a communications interface 902, and a memory 903. The processor 901, the communications interface 902, and the memory 903 may communicate with each other by using an internal connection channel, and transfer a control signal and/or a data signal.

It may be clearly understood by a person of skilled in the art that, for ease and brief description, for a detailed working process of the foregoing apparatuses and units, reference may be made to a corresponding process in the foregoing method embodiments, and details are not described herein again.

According to the apparatus 800 and the apparatus 900 provided in this application, the parking process of the vehicle is divided into at least two stages, so that difficulty in implementing an objective at each stage is reduced, and obtaining an automatic parking strategy corresponding to a complete parking process is much easier, thereby increasing a success rate of automatic parking in a complex parking scenario.

The apparatus embodiments completely correspond to the method embodiments, and corresponding modules perform corresponding steps. For example, the obtaining unit performs the obtaining step in the method embodiment, and other steps than the obtaining step may be performed by the processing unit or the processor. For a function of a specific unit, refer to a corresponding method embodiment. Details are not described herein again.

In the embodiments of this application, the sequence numbers of the processes do not mean execution sequences. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel, and various media that can store, contain and/or carry an instruction and/or data.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brief description, for a detailed working process of the foregoing system, apparatuses, and units, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining an automatic parking strategy, comprising:
    determining, according to an automatic parking strategy, a target parking action corresponding to a current parking stage, wherein the current parking stage is one of a plurality of parking stages comprised in a parking process of a vehicle, wherein the automatic parking strategy is determining, as the target parking action, a parking action with a highest value in a plurality of parking actions corresponding to the current parking stage;
    performing the target parking action;
    obtaining feedback information, wherein the feedback information is used to indicates whether a result of performing the target parking action reaches a predetermined objective, and the predetermined objective is a predetermined position of the vehicle relative to a target parking spot, and/or the predetermined objective is a status of the vehicle in the parking process; and
    updating the automatic parking strategy based on the feedback information, where when the feedback information is $\theta_t$ and $\theta_{t-1}$, and $|\theta_t|<|\theta_{t-1}|$, increasing the value of the target parking action based on $\theta_t$ and $\theta_{t-1}$, wherein $\theta_t$ and $\theta_{t-1}$ are the included angles at the two adjacent moments, $\theta_t \neq 0$, and the value of the target parking action is proportional to $$\frac{|\theta_{t-1}|}{|\theta_t|}.$$

2. The method according to claim 1, wherein before the determining, according to an automatic parking strategy, a target parking action corresponding to a current parking stage, the method further comprises:
    determining the current parking stage based on an included angle between a current preset direction of the vehicle and a reference direction, wherein there is a preset correspondence between the current parking stage and the included angle.

3. The method according to claim 2, wherein the preset direction of the vehicle is a longitudinal axis direction of the vehicle, the reference direction is a longitudinal axis direction of the target parking spot, and the included angle is an acute angle or a right angle.

4. The method according to claim 3, wherein the determining the current parking stage based on an included angle between a current preset direction of the vehicle and a reference direction comprises:
    when the included angle is greater than or equal to a first included angle threshold, determining that the current parking stage is an initial stage, wherein the first included angle threshold is less than 90 degrees.

5. The method according to claim 4, wherein
    the target parking action is driving into the target parking spot at a first steering angle, wherein the first steering angle is less than a maximum steering angle of the vehicle; and
    the predetermined objective is that the included angle is less than or equal to the first included angle threshold and the vehicle enters the target parking spot.

6. The method according to claim 4, wherein the automatic parking strategy comprises determining, as the target parking action, a parking action with a highest value in a plurality of parking actions corresponding to the current parking stage; and the updating the automatic parking strategy based on the feedback information comprises:

when the feedback information comprises the included angles at two adjacent moments during the target parking action, and an absolute value of a difference between the included angles at the two adjacent moments is greater than a preset included angle threshold, reducing a value of the target parking action.

7. The method according to claim 3, wherein the determining the current parking stage based on an included angle between a current preset direction of the vehicle and a reference direction comprises:

when the included angle is greater than a second included angle threshold and less than the first included angle threshold, determining that the current parking stage is a transition stage, wherein both the first included angle threshold and the second included angle threshold are less than 90 degrees, and the second included angle threshold is less than the first included angle threshold.

8. The method according to claim 7, wherein the target parking action is driving to the target parking spot at a second steering angle, wherein the second steering angle is equal to the maximum steering angle of the vehicle; and the predetermined objective is that the included angle is less than or equal to the second included angle threshold and the vehicle enters the target parking spot.

9. The method according to claim 3, wherein the determining the current parking stage based on an included angle between a current preset direction of the vehicle and a reference direction comprises:

when the included angle is less than or equal to the second included angle threshold, determining that the current parking stage is a fine-tuning stage, wherein the second included angle threshold is less than 90 degrees.

10. An apparatus for determining an automatic parking strategy, comprising:

at least one processor;

a non-transitory computer-readable storage medium coupled to the at least one processor and storing programming instructions for execution by the at least one processor, the programming instructions instruct the at least one processor to perform the following operations:

determining, according to an automatic parking strategy, a target parking action corresponding to a current parking stage, wherein the current parking stage is one of a plurality of parking stages comprised in a parking process of a vehicle, wherein the automatic parking strategy is determining, as the target parking action, a parking action with a highest value in a plurality of parking actions corresponding to the current parking stage;

performing the target parking action;

obtaining feedback information, wherein the feedback information indicates whether a result of performing the target parking action reaches a predetermined objective, and the predetermined objective is a predetermined position of the vehicle relative to a target parking spot, and/or the predetermined objective is a status of the vehicle in the parking process; and updating the automatic parking strategy based on the feedback information, where when the feedback information is $\theta_t$ and $\theta_{t-1}$, and $|\theta_t|<|\theta_{t-1}|$, increasing the value of the target parking action based on $\theta_t$ and $\theta_{t-1}$, wherein $\theta_t$ and $\theta_{t-1}$ are the included angles at the two adjacent moments, $|\theta_t|\neq 0$, and the value of the target parking action is proportional $$\frac{|\theta_{t-1}|}{|\theta_t|}.$$

11. The apparatus according to claim 10, wherein before determining, according to the automatic parking strategy, the target parking action corresponding to the current parking stage, the programming instructions instruct the at least one processor to perform:

determining the current parking stage based on an included angle between a current preset direction of the vehicle and a reference direction, wherein there is a preset correspondence between the current parking stage and the included angle.

12. The apparatus according to claim 11, wherein the preset direction of the vehicle is a longitudinal axis direction of the vehicle, the reference direction is a longitudinal axis direction of the target parking spot, and the included angle is an acute angle or a right angle.

13. The apparatus according to claim 12, wherein the programming instructions instruct the at least one processor to perform:

determining, when the included angle is greater than or equal to a first included angle threshold, the current parking stage is an initial stage, wherein the first included angle threshold is less than 90 degrees.

14. The apparatus according to claim 13, wherein the programming instructions instruct the at least one processor to perform:

driving the target parking action into the target parking spot at a first steering angle, wherein the first steering angle is less than a maximum steering angle of the vehicle; and the predetermined objective is that the included angle is less than or equal to the first included angle threshold and the vehicle enters the target parking spot.

15. The apparatus according to claim 14, wherein the programming instructions instruct the at least one processor to perform:

determining the automatic parking strategy, as the target parking action, a parking action with a highest value in a plurality of parking actions corresponding to the current parking stage;

reducing a value of the target parking action when the feedback information comprising the included angles at two adjacent moments during the target parking action, and an absolute value of a difference between the included angles at the two adjacent moments is greater than a preset included angle threshold.

16. The apparatus according to claim 15, wherein the programming instructions instruct the at least one processor to perform:

determining the current parking stage is a transition stage when the included angle is greater than a second included angle threshold and less than the first included angle threshold, wherein both the first included angle threshold and the second included angle threshold are less than 90 degrees, and the second included angle threshold is less than the first included angle threshold.

17. The apparatus according to claim 16, wherein the programming instructions instruct the at least one processor to perform:
  driving the target parking action to the target parking spot at a second steering angle, wherein the second steering angle is equal to the maximum steering angle of the vehicle; and
  the predetermined objective is that the included angle is less than or equal to the second included angle threshold and the vehicle enters the target parking spot.

18. A computer-readable storage medium, wherein the computer-readable storage medium stores a computer program, and the computer program enables a computer to perform a method comprising:
  determining, according to an automatic parking strategy, a target parking action corresponding to a current parking stage, wherein the current parking stage is one of a plurality of parking stages comprised in a parking process of a vehicle, wherein the automatic parking strategy is determining, as the target parking action, a parking action with a highest value in a plurality of parking actions corresponding to the current parking stage;
  performing the target parking action;
  obtaining feedback information, wherein the feedback information indicates whether a result of performing the target parking action reaches a predetermined objective, and the predetermined objective is a predetermined position of the vehicle relative to a target parking spot, and/or the predetermined objective is a status of the vehicle in the parking process; and
  updating the automatic parking strategy based on the feedback information, where when the feedback information is $\theta_t$ and $\theta_{t-1}$, and $|\theta_t|<|\theta_{t-1}|$, increasing the value of the target parking action based on $\theta_t$ and $\theta_{t-1}$, wherein $\theta_t$ and $\theta_{t-1}$ are the included angles at the two adjacent moments, $|\theta_t| \neq 0$, and the value of the target parking action is proportional to $$\frac{|\theta_{t-1}|}{|\theta_t|}.$$

* * * * *